United States Patent [19]
Kuno et al.

[11] Patent Number: 5,664,850
[45] Date of Patent: Sep. 9, 1997

[54] ANTI-SKID CONTROL SYSTEM FOR AN ELECTRICALLY OPERATED VEHICLE

[75] Inventors: Tetsuya Kuno, Toyota; Toshiaki Hamada, Okazaki; Tadashi Terazawa, Toyota, all of Japan

[73] Assignee: Aisin Seiki Kabushiki Kaisha, Kariya, Japan

[21] Appl. No.: 710,026

[22] Filed: Sep. 11, 1996

[30] Foreign Application Priority Data

Sep. 19, 1995 [JP] Japan ................... 7-240237

[51] Int. Cl.$^6$ ............... B60L 7/00; B60T 8/64
[52] U.S. Cl. ................. 303/150; 303/3; 701/81
[58] Field of Search ................. 303/3, 15, 16, 303/20, 149, 150, 152, 194; 364/424.06, 426.015, 426.017, 426.025, 426.026

[56] References Cited

U.S. PATENT DOCUMENTS

| | | | |
|---|---|---|---|
| 4,813,266 | 3/1989 | Nash | 73/9 |
| 5,171,070 | 12/1992 | Okazaki et al. | 303/176 |
| 5,419,624 | 5/1995 | Adler et al. | 303/141 X |
| 5,443,583 | 8/1995 | Sugawara et al. | 303/169 |
| 5,511,866 | 4/1996 | Terada et al. | 303/152 |

FOREIGN PATENT DOCUMENTS 3-67770  3/1991  Japan.

*Primary Examiner*—Josie Ballato
*Attorney, Agent, or Firm*—Burns, Doane, Swecker & Mathis, LLP

[57] ABSTRACT

The present invention is directed to an anti-skid control system for controlling a braking force applied to road wheels including driven wheels of an electrically operated vehicle which has an electrical motor for driving the driven wheels. A hydraulic braking pressure is supplied to each wheel brake cylinder through an actuator. The actuator is controlled by a braking force controller into which output signals of wheel speed sensors are fed. A band-pass filter is provided for passing the wheel speeds of the driven wheels having an oscillation property within a predetermined band of frequencies, out of the wheel speeds detected by the wheel speed sensors. And, a coefficient of friction of a road is estimated to be relatively low when the output of the band-pass filter is in a predetermined range of frequencies. The hydraulic braking pressure in each wheel brake cylinder is controlled by the braking force controller in accordance with the estimated coefficient of friction and in response to the wheel speeds detected by the wheel speed sensors, thereby to control the braking force applied to each road wheel.

7 Claims, 9 Drawing Sheets

ANTI-SKID CONTROL SYSTEM FOR AN ELECTRICALLY OPERATED VEHICLE

BACKGROUND OF THE INVENTION

1. Field of the Invention

The present invention relates to an anti-skid control system for an electrically operated vehicle to control the braking force applied to road wheels including driven wheels in a braking operation, and more particularly to the anti-skid control system for estimating a coefficient of friction of a road surface immediately after the vehicle is braked, and controlling the braking force in accordance with the estimated coefficient of friction.

2. Description of the Related Arts

In general, the coefficient of friction between the road surface and the road wheels is varied in dependence upon the kinds of the road wheels, the road surface condition and the like. Especially, the coefficient of friction (herein, abbreviated as $\mu$) is varied to a large extent in dependence upon the conditions of the road on which the vehicle is running, such as a dry road surface and a wet road surface. Thus, it is very important to detect the coefficient of friction of the road surface (hereinafter, referred to as the road-CF). In this respect, when the vehicle is running, it is impossible to directly detect the road-CF. Therefore, according to an anti-locking control method disclosed in Japanese Patent Laid-open publication No.3-67770 for example, a model vehicle speed is calculated from the maximum of the wheel speeds of the four wheels, and a mean deceleration of the model vehicle speed for a certain period of time is calculated, and then the road-CF is determined on the basis of the mean deceleration. However, it is difficult for this method using the mean deceleration to estimate the road-CF immediately after the vehicle is braked.

According to an electrically operated vehicle, i.e., the vehicle operated by an electric motor, if the anti-skid operation is initiated when the vehicle is running on the road of a relatively low coefficient of friction, the wheel speeds of driven wheels will be oscillated at a certain period which is determined in dependence upon the type of vehicle. That is, in the case where the electrically operated vehicle is braked on the road surface of the relatively low coefficient of friction, and where the coefficient of friction between the tire and the road surface decreases after it reached its peak value, the wheel acceleration is greatly decreased, because the inertia moment of the tire in its rotating direction is smaller than the inertia moment of the motor for driving the road wheels. On the contrary, the inertia of the motor is relatively large. Therefore, a rotational speed differential (rotational angular velocity differential) is caused between the rotational speed (nm) of the motor and the rotational speed (nd) of the differential gear. In accordance with the rotational angular velocity differential, the torque is transmitted to the motor so as to decrease the rotational speed of the motor. However, since the inertia of the motor is relatively large, the rotational speed of the motor is not decreased so much, whereas the torque is provided by its reaction to rotate the tire (in a direction for reducing the braking torque). Consequently, the wheel speed, which once tended to be decreased, tends to gain the speed again, thereby to cause a vibration or oscillation of the wheel speed. When the vehicle is braked on the road of a relatively high coefficient of friction (high-$\mu$), the oscillation still occurs. In this case, however, even if the braking torque is decreased by the reaction force, the tire torque is relatively large on that road surface. Therefore, the motion of the vehicle is not so much affected by the coefficient of friction of the road surface, until its position in a coefficient of friction-slip rate characteristic comes to be located in such a region as being almost flat to reach the peak region. Accordingly, it is possible to distinguish the road conditions of the high-$\mu$ and the low-$\mu$, on the basis of the oscillating state of the wheel speed of the road wheel running on the high-$\mu$ road and that of the road wheel running on the low-$\mu$ road.

SUMMARY OF THE INVENTION

Accordingly, it is an object of the present invention to provide an anti-skid control system for an electrically operated vehicle wherein a coefficient of friction of a road surface can be estimated immediately after the vehicle is braked.

In accomplishing the above and other objects, an anti-skid control system is provided for controlling a braking force applied to road wheels including driven wheels of an electrically operated vehicle. The anti-skid control system includes wheel brake cylinders which are operatively connected to the road wheels, respectively, for applying braking force thereto, a hydraulic pressure generator for supplying a hydraulic braking pressure to each of the wheel brake cylinders, an actuator which is disposed in each hydraulic circuit communicating the hydraulic pressure generator with each of the wheel brake cylinders for controlling the hydraulic braking pressure in each of the wheel brake cylinders. The anti-skid control system further includes wheel speed sensors for detecting wheel speeds of the road wheels, and providing output signals corresponding to the wheel speeds, respectively, a band-pass filter for passing the wheel speeds of the driven wheels having an oscillation property within a predetermined band of frequencies, out of the wheel speeds detected by the wheel speed sensors, and a coefficient of friction estimation unit which estimates a coefficient of friction of a road on which the vehicle is running. The coefficient of friction estimation unit is adapted to estimate that the coefficient of friction of the road is relatively low when the output of the band-pass filter is in a predetermined range of frequencies. And, a braking force controller is provided for controlling the actuator in accordance with at least the coefficient of friction estimated by the coefficient of friction estimation unit, and in response to the wheel speeds detected by the wheel speed sensors, thereby to control the braking force applied to each of the road wheels.

In the above-described anti-skid control system, the predetermined range of frequencies is preferably set in accordance with an oscillation of the wheel speed of the driven wheel which occurs when the vehicle is braked during the vehicle is running on a road having a relatively low coefficient of friction.

Preferably, the above-described anti-skid control system further includes vehicle speed estimation unit which estimates a vehicle speed on the basis of the wheel speeds of the road wheels detected by the wheel speed sensors, and the coefficient of friction of the road estimated by the coefficient of friction estimation unit.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
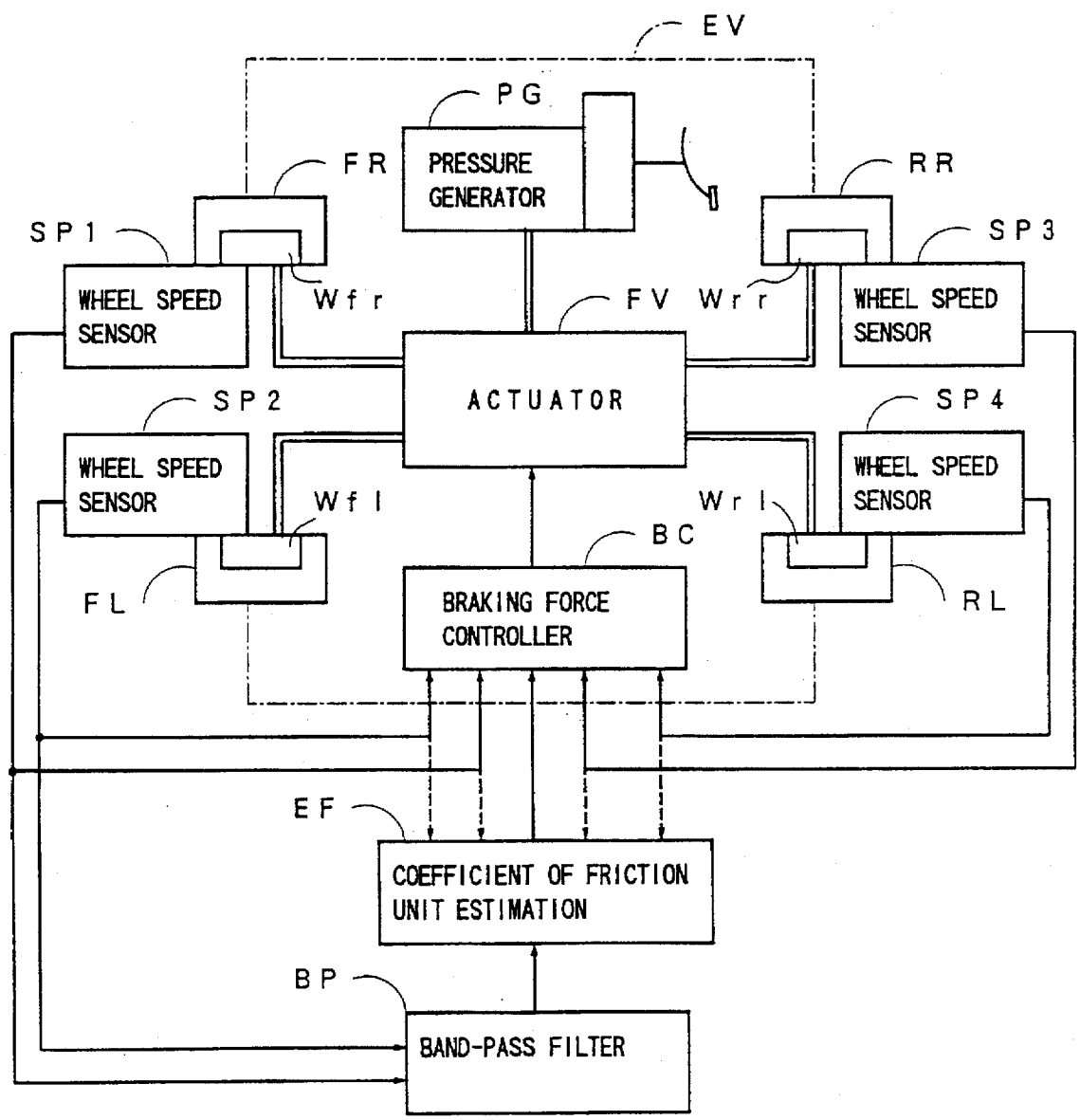
FIG. 1 is a general block diagram illustrating an anti-skid control system for an electrically operated vehicle according to the present invention.

Referring to FIG. 1, there is schematically illustrated an anti-skid control system for an electrically operated vehicle (EV) according to the present invention, which controls a braking force applied to each of the front road wheels (FR), (FL) or driven wheels in the present embodiment, and rear road wheels (RR), (RL) or non-driven wheels in the present embodiment. A hydraulic pressure generator (PG) is provided for supplying a hydraulic braking pressure to each of the wheel brake cylinders (Wfr), (Wfl), (Wrr), (Wrl). An actuator (FV) is disposed in each hydraulic circuit communicating the hydraulic pressure generator (PG) with each of the wheel brake cylinders for controlling the hydraulic braking pressure therein. Wheel speed sensors (SP1), (SP2), (SP3), (SP4) are provided for detecting wheel speeds of the road wheels, and providing output signals corresponding to the wheel speeds, respectively. A band-pass filter (BP) is provided for passing the wheel speeds of the driven wheels (FR), (FL) having an oscillation property within a predetermined band of frequencies, out of the wheel speeds detected by the wheel speed sensors. A coefficient of friction estimation unit (EF) is provided for estimating a coefficient of friction of a road on which the vehicle is running. The coefficient of friction estimation unit (EF) is adapted to estimate that the coefficient of friction of the road is relatively low when the output of the band-pass filter (BP) is in a predetermined range of frequencies. And, a braking force controller (BC) is provided for controlling the actuator (FV) in accordance with at least the coefficient of friction estimated by the coefficient of friction estimation unit (EF), and in response to the wheel speeds detected by the wheel speed sensors, thereby to control the braking force applied to each of the road wheels.

According to the embodiment as shown in FIG. 1, therefore, the determination of the coefficient of friction can be made in such a fashion that the coefficient of friction estimation unit (EF) estimates that the coefficient of friction of the road is relatively low when the output of the band-pass filter (BP) is in the predetermined range of frequencies.

Thus, the determination of the coefficient of friction can be made immediately after the vehicle is braked according to the present embodiment, comparing with the determination made in the prior estimation method which uses the decreasing rate of the deceleration of the vehicle. The present embodiment is applicable to any types of electrically operated vehicles by setting the most appropriate oscillation frequencies to each vehicle. The predetermined range of frequencies may be set in accordance with the oscillation of the wheel speed of the driven wheel (FR) or (FL) which occurs when the vehicle is braked during the vehicle is running on the road of the relatively low coefficient of friction. The predetermined range of frequencies may be the same as the band of the band-pass filter (BP). In addition to the above system, vehicle speed estimation unit (not shown in FIG. 1) may be provided for estimating a vehicle speed on the basis of the wheel speeds of the road wheels detected by the wheel speed sensors, and the coefficient of friction of the road estimated by the coefficient of friction estimation unit (EF). The vehicle speed estimation unit may be adapted to estimate the vehicle speed to be relatively high, when the coefficient of friction estimation unit (EF) estimates the coefficient of friction of the road to be relatively low. Or, the braking force controller (BC) may be adapted to control the actuator (FV) to provide a period for decreasing or increasing the hydraulic braking pressure in each of the wheel brake cylinders (Wfr), (Wfl) operatively mounted on the driven wheels (FR), (FL), on the basis of the coefficient of friction of the road estimated by the coefficient of friction estimation unit (EF). For example, the period for decreasing the hydraulic braking pressure may be provided by the actuator (FV) to be relatively long, when the estimated coefficient of friction of the road is relatively low. Or, the period for increasing the hydraulic braking pressure may be provided to be relatively short, when the estimated coefficient of friction of the road is relatively low.

Figure 2:
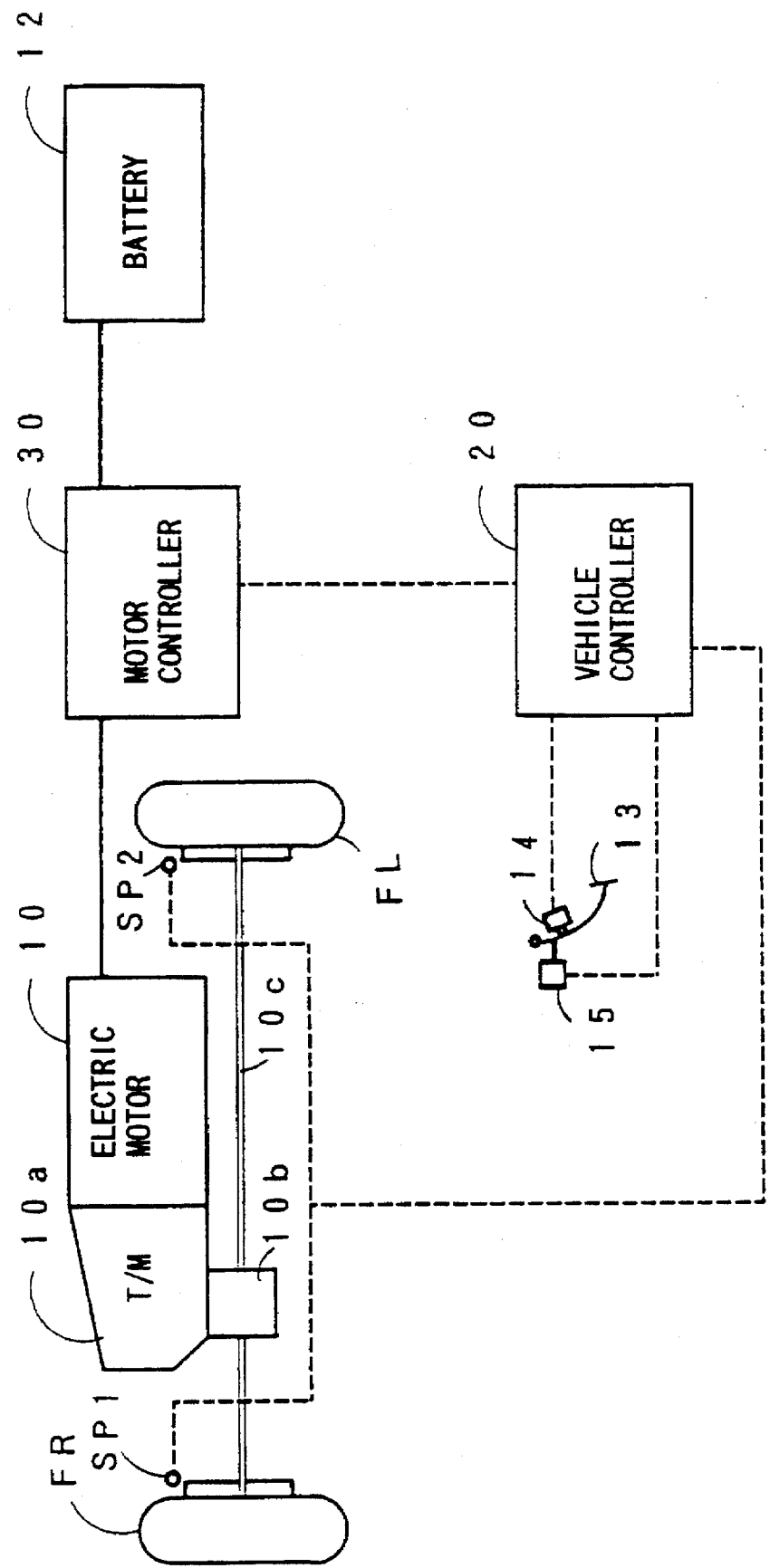
FIG. 2 is a schematic block diagram of an electrically operated vehicle according to an embodiment of the present invention.

More specifically, the details of the embodiment disclosed in FIG. 1 are illustrated in FIGS. 2–6. Referring to FIG. 2, an electric motor 10 is connected to a battery 12 and operatively connected to the front road wheels (FR), (FL), which are driven by the electric motor 10 and which are also referred to as driven wheels, through a known transmission 10a and a differential gear 10b. The electric motor 10 is adapted to drive (or rotate) a rotating shaft 10c as shown in FIG. 2, with electric power fed from the battery 12, or to recover electric power, which is produced by the electric motor 10 operating as a generator in response to rotation of the rotating shaft 10c driven by the driven wheels (FR), (FL), by charging the battery 12.

Figure 3:
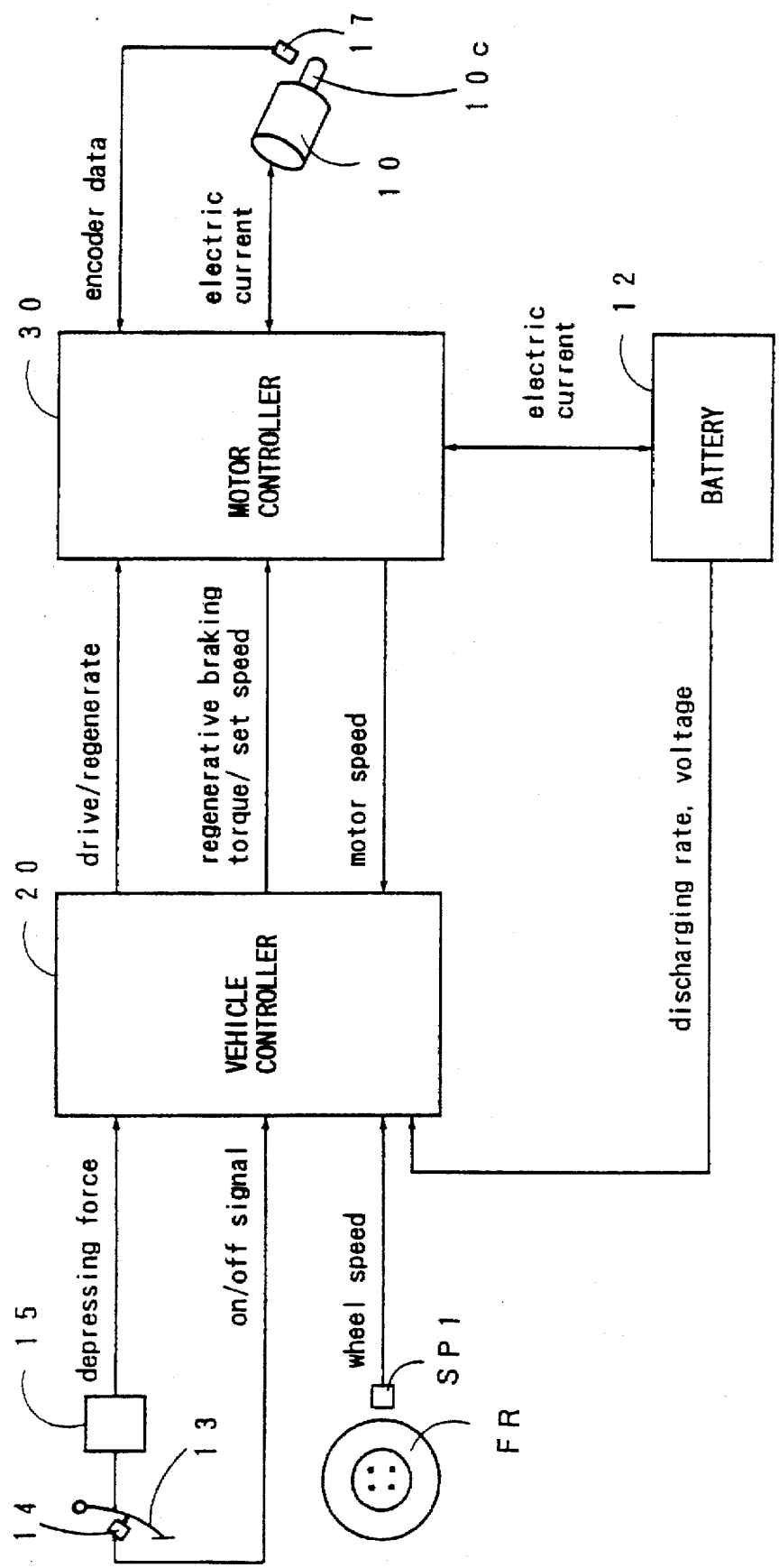
FIG. 3 is a schematic block diagram of a vehicle controller and a motor controller according to the above embodiment of the present invention.

Referring to FIG. 3, a motor controller 30 is provided for actuating the electric motor 10 to drive the driven wheel (FR) which represents the driven wheels (FR), (FL), i.e., to perform a driving operation, or to operate as a generator, i.e., to perform a regenerative braking operation in accordance with a switching signal discharged from a vehicle controller 20 which serves for detecting a skidding condition of the driven wheel (FR), and setting a desired decreasing wheel speed, and serves for other functions in connection with the vehicle's operation. The vehicle controller 20 is connected to a brake switch 14 which turns on or off in response to depression of a brake pedal 13. The controller 20 is also connected to a depressing force sensor 15 which detects the depressing force applied to the brake pedal 13, and a wheel speed sensor (SP1) which detects rotating speed of the driven wheel (FR), and pressure switches (PS1), (PS2) which will be described later. The vehicle controller 20 further inputs signals indicative of the discharging rate and voltage of the battery 12, rotating speed signal of the electric motor 10 fed from the motor controller 30, accelerator opening angle detected by an accelerator stroke sensor (not shown), and so on. In response to the above-described data fed into the vehicle controller 20, the vehicle controller 20 is adapted to change the operation of the electric motor 10 between its driving operation and regenerative braking operation, set a driving torque and a regenerative braking torque to be produced by the electric motor 10, and also provide a set speed of rotation for a rotation control mode of the electric motor 10.

The motor controller 30 causes the electric motor 10 to produce the driving torque and the regenerative braking torque in accordance with control signals fed from the vehicle controller 20. For a feed back control provided in the operation by the motor controller 30, the rotational speed of the electric motor 10 is required, which is obtained such that a position of the rotating shaft 10c is detected by an encoder 17 continuously, then fed to the motor controller 30 and also fed to the vehicle controller 20 as described before. In lieu of the encoder 17, a Hall-IC or the like may be employed to detect the rotational speed of the electric motor 10.

Next, a driving circuit for driving the electric motor 10 will be explained with reference to FIG. 4. The electric motor 10 used in the present embodiment is an induction motor having a rotor with permanent magnets for providing magnetic poles, and a stator with three-phase wires to which A.C. power is fed to generate a magnetic field for rotating the rotor. When the rotor of the electric motor 10 is rotating in accordance with the rotation of the road wheels, the electric motor 10 can be braked by generating a magnetic field for preventing the rotor from rotating. The electric power generated in the stator is recovered to charge the battery 12 thereby to brake the road wheels, i.e., to perform the regenerative braking operation. The above-described encoder 17 is disposed in the electric motor 10 so as to detect each position of the magnetic poles. The circuit for driving the electric motor 10 includes the motor controller 30 and the vehicle controller 20, in each of which a microcomputer is provided, and which are communicated with each other, as shown in FIG. 3. The former is provided for controlling the operation of the electric motor 10, while the latter is provided for controlling the regenerative braking operation.

Figure 4:
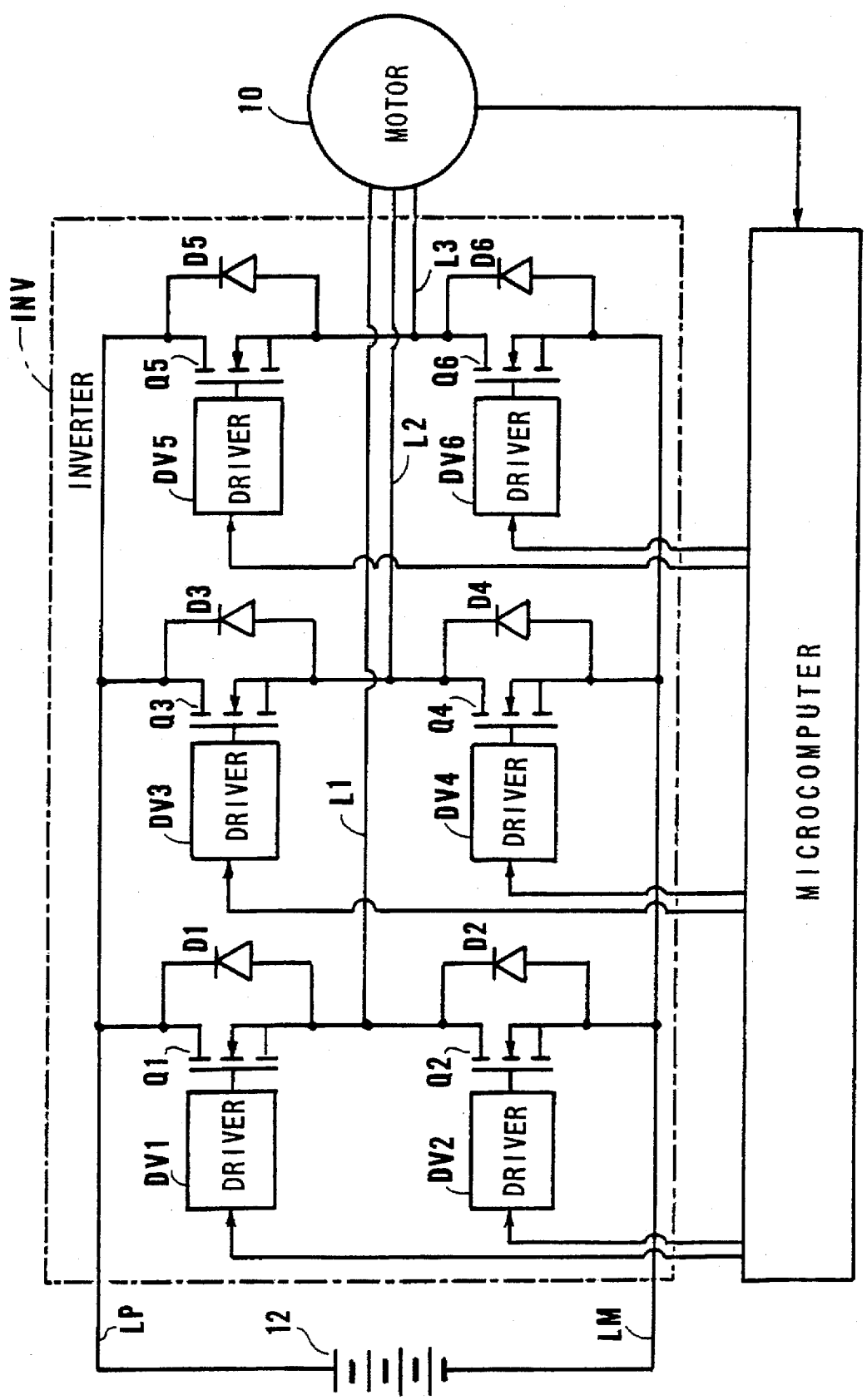
FIG. 4 is a schematic block diagram of the motor controller according to the above embodiment of the present invention.

As shown in FIG. 4, the motor controller 30 includes an inverter (INV) which has output lines L1, L2, L3 connected to each wire of the electric motor 10, respectively, and which has power lines (LP), (LM) connected to the battery 12. The battery 12 may be a lead acid battery, but may be of other types. In addition, a condenser having a large capacity, or a sub-battery or the like may be connected in parallel with the lead acid battery. The inverter (INV) includes six switching elements (Q1)–(Q6). With at least one of the switching elements (Q1), (Q3), (Q5) in the upper section in FIG. 4 and at least one of the switching elements (Q2), (Q4), (Q6) in the lower section turned on, a circuit is made to feed a current from the battery 12 to each wire of the electric motor 10. However, such pairs as the switching elements (Q1) and (Q2), the switching elements (Q3) and (Q4), and the switching elements (Q5) and (Q6) are not turned on simultaneously, so as to prevent an excessive current from being fed through a short-circuit formed between the upper and lower sections in FIG. 4. Drivers (DV1)–(DV6) are connected with control terminals of the switching elements (Q1)–(Q6), respectively, input terminals of which are connected with output ports of the motor controller 30, so that the microcomputer in the motor controller 30 actuates the switching elements (Q1)–(Q6) to control the current fed to each wire of the motor 10.

It is necessary to shift the position of each magnetic pole formed in the stator sequentially along each magnetic pole of the rotor in the rotating direction of the rotor. Therefore, the microcomputer in the motor controller 30 determines a timing of each control signal to be fed to each of the drivers (DV1)–(DV6) in response to a signal output from the encoder 17 installed within the motor 10. Also, it is possible to brake the motor 10 by controlling the timing of each control signal to be fed to each of the drivers (DV1)–(DV6). In this case, the motor 10 operates as a generator to generate the electric power in the stator, and to recover it into the battery 12 thereby to provide the regenerative braking. That is, if the voltage of the output line (L1) comes to be higher than the voltage of the power line (LP), the current is fed from the output line (L1) to the power line (LP) through the diode (D1), whereas if the voltage of the output line (L1) comes to be lower than the voltage of the power line (LM), the current is fed from the power line (LM) to the output line (L1) through the diode (D2) thereby to charge it into the battery 12. Similarly, if the voltage of the output line (L3) comes to be higher than the voltage of the power line (LP), the current is fed from the output line (L3) to the power line (LP) through the diode (D5), whereas if the voltage of the output line (L3) comes to be lower than the voltage of the power line (LM), the current is fed from the power line (LM) to the output line (L3) through the diode (D6) thereby to charge it into the battery 12. The motor controller 30 has a potentiometer (not shown) which detects a depressed amount of the accelerator pedal (not shown), and controls a driven amount (rotational speed) of the motor 10 in response to the depressed amount of the accelerator pedal. Whereas, the vehicle controller 20 controls the regenerative braking operation by the motor 10. That is, the vehicle controller 20 controls the width of pulse signals fed to the control terminals of the switching elements (Q1)–(Q6), thereby to control the driving torque and the driven amount of the motor 10.

Figure 5:
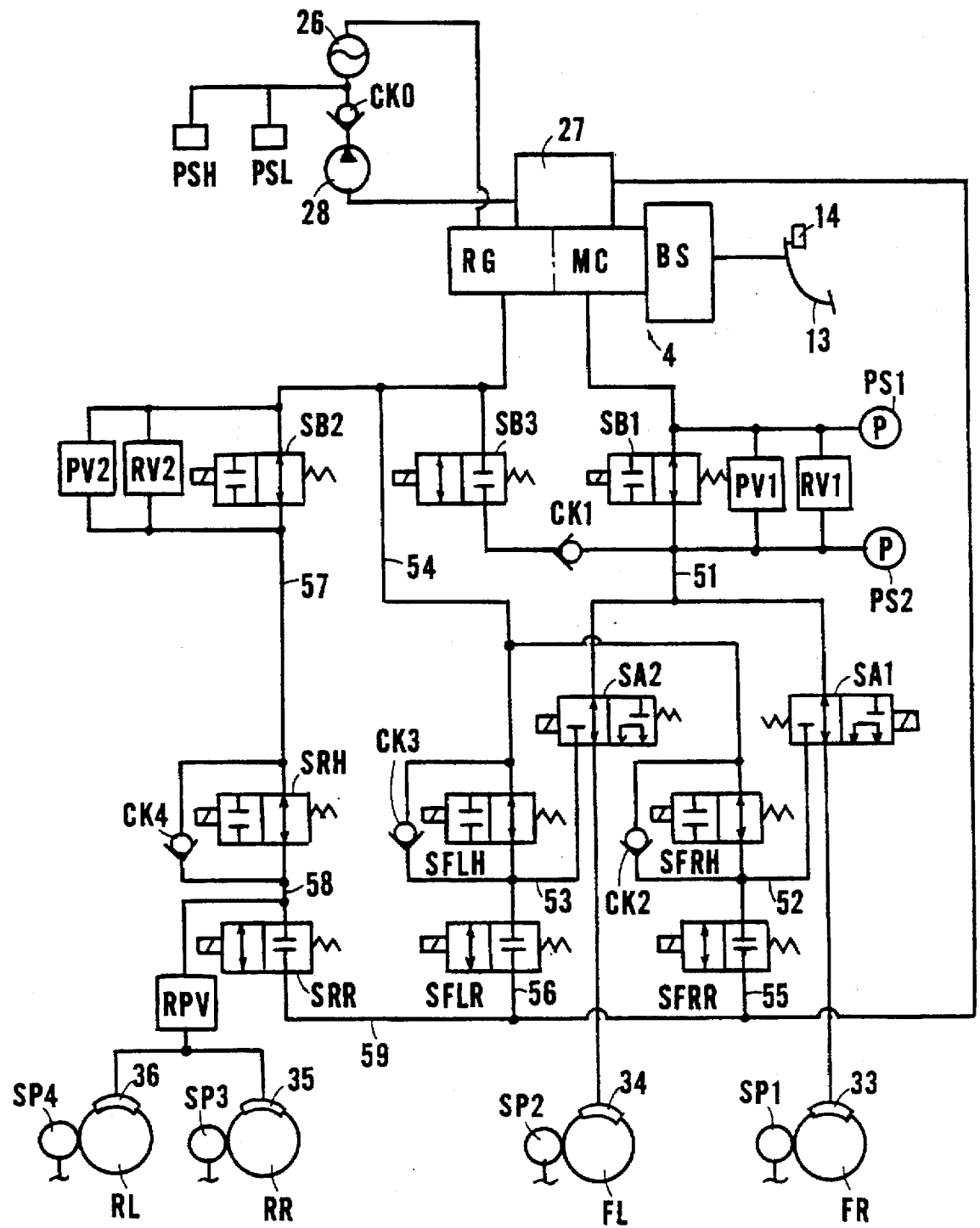
FIG. 5 is a schematic block diagram of a hydraulic braking system including the anti-skid control system of the above embodiment of the present invention.

Referring to FIG. 5, there is disclosed a hydraulic pressure control system for use in the anti-skid control operation of the above-described electrically operated vehicle. The hydraulic pressure control system has a pressure generator 4 which includes a master cylinder (MC) and a regulator (RG), and includes a booster (BS) which boosts up the operation of a piston (not shown) in the master cylinder (MC). The brake fluid is stored in a reservoir 27 and is pressurized by a motor operated fluid pump 28 so as to be charged into the accumulator 26 through a check valve (CK0). Between the check valve (CK0) and the the accumulator 26, a pair of pressure sensors (PSH), (PSL) are disposed. The master cylinder (MC) generates a master cylinder pressure in response to depression of the brake pedal 13, and supplies it to a main passage 51 which is provided for wheel brake cylinders 33, 34 operatively mounted on the front road wheels (FR), (FL). Whereas, the regulator (RG) regulates the hydraulic pressure supplied from the accumulator 26 into a regulated pressure in response to depression of the brake pedal 13, and supplies it to a main passage 57 which is provided for wheel brake cylinders 35, 36 operatively mounted on the rear road wheels (RR), (RL).

A changeover valve (SB1) of a normally open 2-port 2-position solenoid valve is disposed in the main passage 51 for the front road wheels, and a proportioning valve (PV1) and a relief valve (RV1) are disposed in parallel with the changeover valve (SB1), respectively. A pair of pressure sensors (PS1), (PS2) are connected to the upstream and downstream of the changeover valve (SB1), respectively, so as to detect the pressure in the main passage 51. The pressure sensor (PS1) serves as a main sensor, and the pressure sensor (PS2) serves as a subordinate sensor, so as to provide a redundancy system, in which the pressure can be detected by a proper one of the pressure sensors (PS1), (PS2) when a malfunction of either one of them occurs. Inexpensive pressure switches may be substituted for the pressure sensors (PS1), (PS2). Also, A changeover valve (SB2) of a normally open 2-port 2-position solenoid valve is disposed in the main passage 57 for the rear road wheels, and a proportioning valve (PV2) and a relief valve (RV2) are disposed in parallel with the changeover valve (SB2), respectively, as well. The main passage 57 is connected to the downstream of the changeover valve (SB1) through a changeover valve (SB3) of a normally closed 2-port 2-position solenoid valve and a check valve (CK1), so as to supply the regulated pressure from the regulator (RG) into the main passage 51 for the front road wheels. The changeover valve (SB3) is provided for compensating a pressure difference between the upstream and downstream of the changeover valve (SB1), which will be caused when it is suddenly switched from its "ON" condition to its "OFF" condition, thereby to deteriorate a feeling of the braking operation due to a noise caused by the rapid pressure change, or due to a rapid depressing operation of the brake pedal.

The wheel brake cylinders 33, 34 are connected to the main passage 51 through a changeover valve (SB1) of normally open 2-port 2-position solenoid valve and changeover valves (SA1), (SA2) of 3-port 2-position solenoid valves, respectively, so that the master cylinder (MC) of the pressure generator 4 is normally communicated with the wheel brake cylinders 33, 34. The changeover valves (SA1), (SA2) are connected to normally open control valves (SFRH), (SFLH) of 2-port 2-position solenoid valves through control passages 52, 53 respectively, which are connected to the regulator (RG) of the pressure generator 4 through a passage 54. Therefore, when the changeover valves (SA1), (SA2) are energized, the wheel brake cylinders 33, 34 are connected to the regulator (RG), and are prevented from communicating with the master cylinder (MC) of the pressure generator 4. The control passages 52, 53 are also connected to relief passages 55, 56 respectively, in which normally closed control valves (SFRR), (SFLR) of 2-port 2-position solenoid valves are disposed, and which are connected to a reservoir 27. In parallel with the valves (SFRH), (SFLH), check valves (CK2), (CK3) are disposed respectively, so as to allow the flow of the brake fluid from the wheel brake cylinders 33, 34 to the pressure generator 4, and block the reverse flow from the pressure generator 4 to the wheel brake cylinders 33, 34.

The regulator (RG) of the pressure generator 4 is connected to the rear main passage 57, in which a normally opened changeover valve (SB2) of a 2-port 2-position solenoid valve is disposed, so that when the changeover valve (SB2) is energized, the main passage 57 is prevented from communicating with the regulator (RG). A proportioning valve (PV2) and a relief valve (RV2) are disposed in parallel with the changeover valve (SB2), respectively. The wheel brake cylinders 35, 36 are connected to the main passage 57 through a proportioning valve (RPV) and a normally open control valve (SRH) of 2-port 2-position solenoid valve. The wheel brake cylinders 35, 36 are also connected to a relief passage 59, in which a normally closed control valve (SRR) of 2-port 2-position solenoid valves is disposed, through the proportioning valve (RPV) which is connected to a passage 58 between the control valves (SRH) and (SRR). The control valve (SRR) is connected to the reservoir 27 through the relief passage 59. In parallel with the control valve (SRH), a check valve (CK4) is disposed, so as to allow the flow of the brake fluid from the wheel brake cylinders 35, 36 to the pressure generator 4, and block the reverse flow from the pressure generator 4 to the wheel brake cylinders 35, 36.

The operation of the valves disclosed in FIG. 5 for controlling the hydraulic pressure in case of the anti-skid control operation will be explained hereinafter. When the ignition switch is turned on, both of the changeover valves (SB1), (SB2) are turned on, and kept to be in their "ON" conditions, as long as the ignition switch is in its "ON" condition (i.e., in the regenerative braking condition). The changeover valve (SB2) is turned off when a malfunction occurs, when the anti-skid control operation starts, or when the pressure difference between the upstream and downstream of the changeover valve (SB1) disappears. Whereas, the changeover valve (SB1) is turned off when a malfunction occurs, when the anti-skid control operation starts, when a shift gear is shifted in a position of parking, neutral, or reverse, or when a malfunction of the battery 12 occurs.

If the locking of the front right wheel (FR) is detected to start the anti-skid control operation, for example, the changeover valve (SA1) and changeover valves (SFRH), (SFRR) are turned on thereby to reduce the hydraulic pressure in the wheel brake cylinder 33, and to prevent the road wheel (FR) from being locked. When the hydraulic pressure in the wheel brake cylinder 33 is to be held, the changeover valve (SFRR) is turned off. When the hydraulic pressure in the wheel brake cylinder 33 is to be increased, the changeover valve (SFRH) is turned off to enable the regulated pressure to be supplied into the wheel brake cylinder 33. By changing the period of time when the changeover valves (SFRH), (SFRR) are turned on and off alternately, the hydraulic pressure in the wheel brake cylinder 33 can be gradually increased to provide a stepped pressure increase, or can be gradually decreased to provide a stepped pressure decrease. With respect to the rear road wheels (RR), (RL), the hydraulic pressure in the wheel brake cylinders 35, 36 can be reduced, when both of the changeover valves (SRH), (SRR) are turned on. It can be held by turning off the changeover valve (SRR) with the changeover valve (SRH) turned on, and it can be increased by turning off both of the changeover valves (SRH), (SRR). The proportioning valve (RPV) is provided for limiting the hydraulic pressure in the wheel brake cylinders 35, 36 so as to prevent it from exceeding the hydraulic pressure in the front wheel brake cylinders 33, 34.

Figure 6:
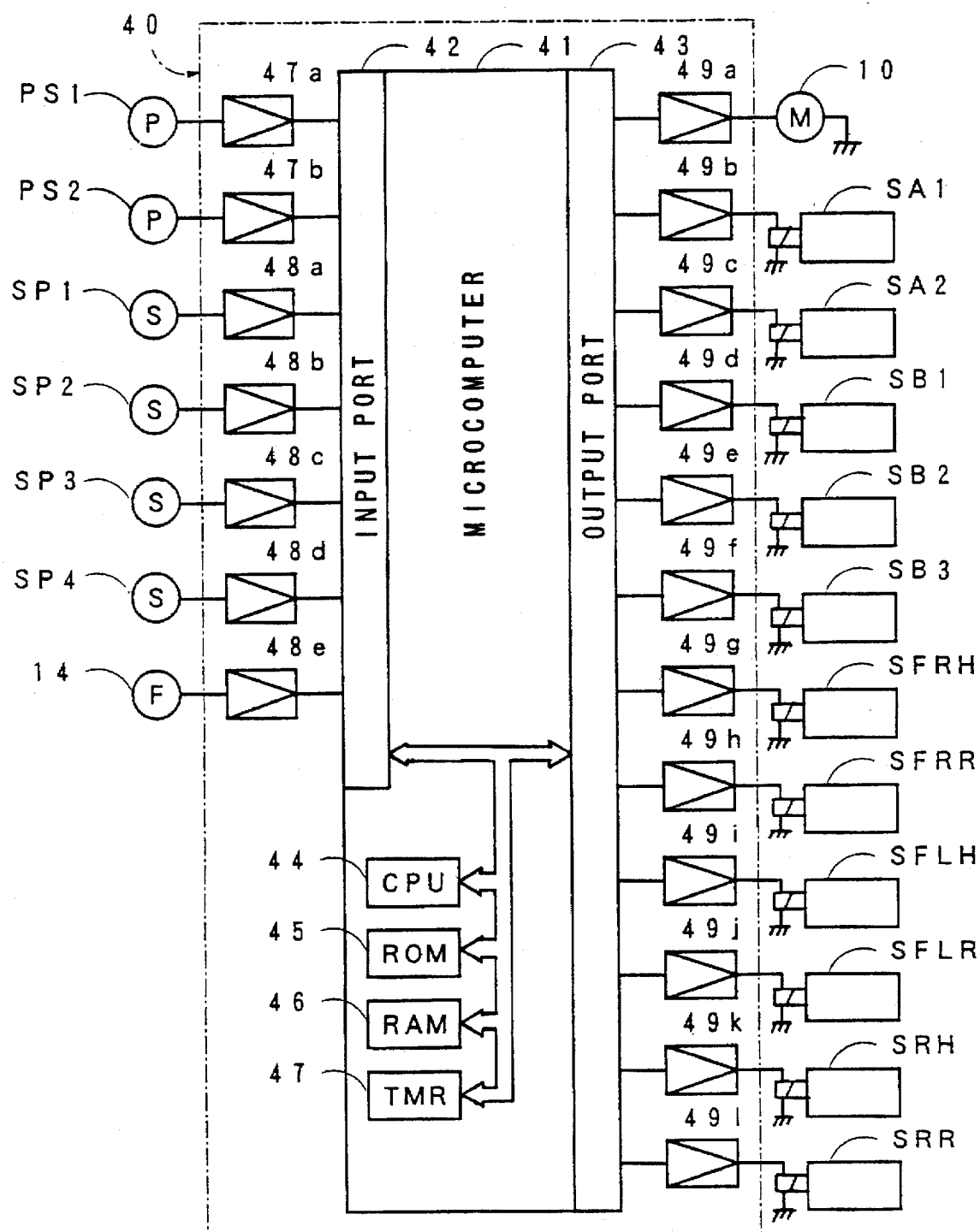
FIG. 6 is a block diagram illustrating the arrangement of the anti-skid controller according to the above embodiment of the present invention.
Figure 7:
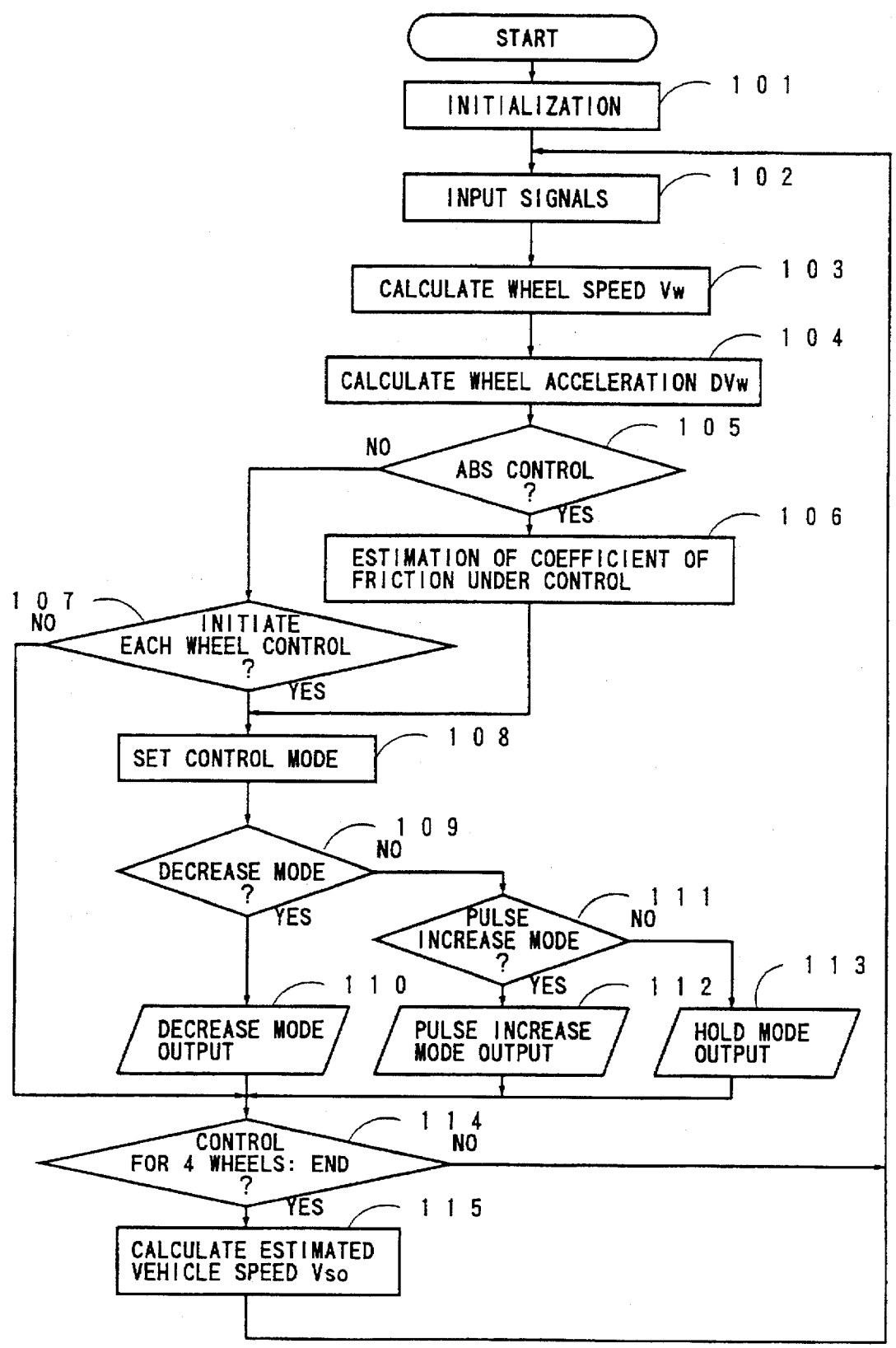
FIG. 7 is a flowchart showing an anti-skid control operation according to the above embodiment of the present invention.
Figure 8:
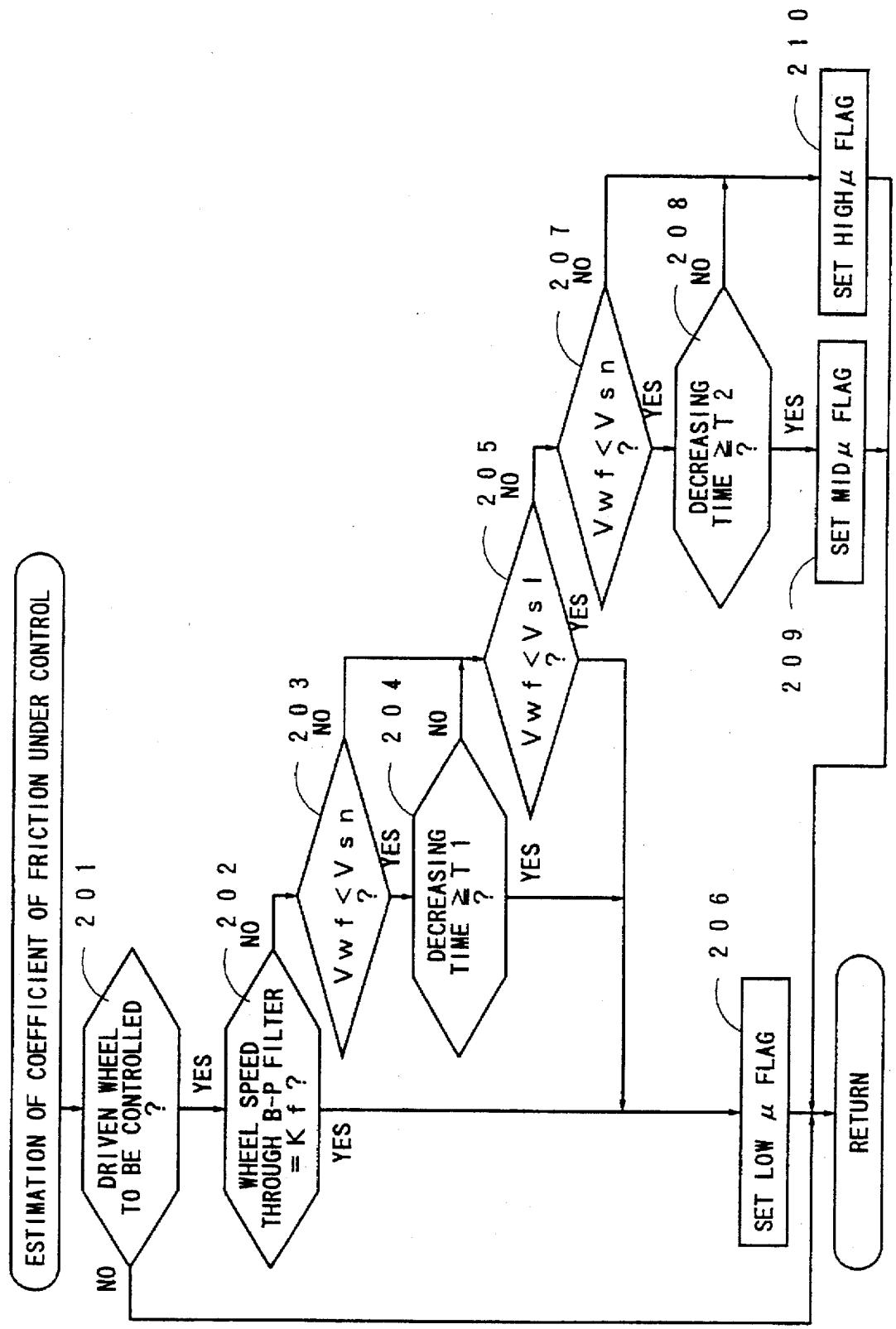
FIG. 8 is a flowchart showing an estimation of the coefficient of friction in the anti-skid control operation according to the above embodiment.
Figure 9:
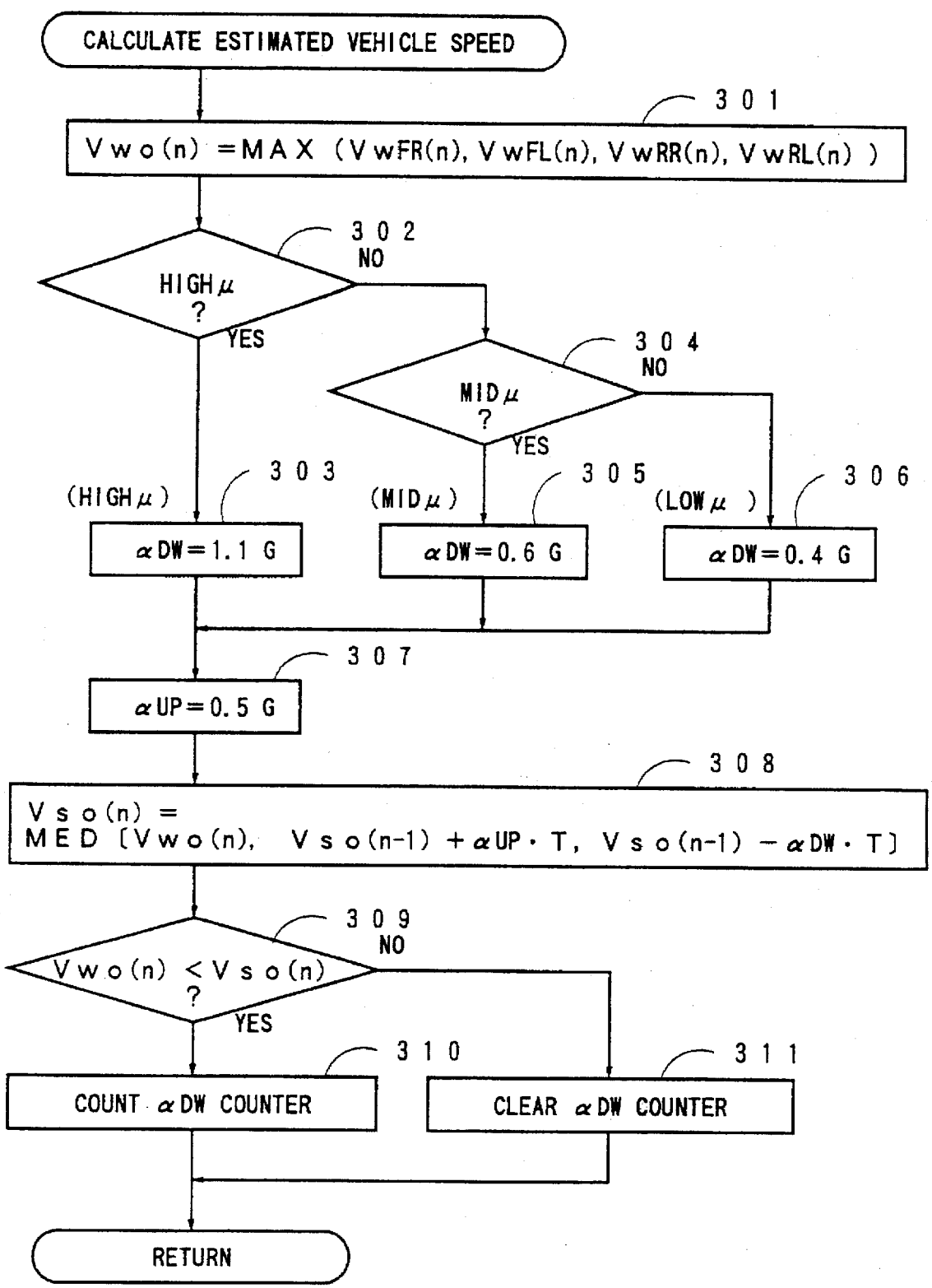
FIG. 9 is a flowchart showing a calculation of the estimated vehicle speed in the anti-skid control operation according to the above embodiment of the present invention.

As shown in FIG. 6, the anti-skid controller 40 is provided with a microcomputer 41 having a central processing unit or CPU 44, a read only memory or ROM 45, a random access memory or RAM 46 and a timer 47, which are connected with an input port 42 and an output port 43 via a common bus. The signals detected by each of the wheel speed sensors (SP1)–(SP4) and the brake switch 14 are fed to the input port 42 via respective amplification circuits 47a, 47b, and 48a to 48e, and then to the CPU 44. Then, a control signal is output from the output port 43 to the electric motor 10 via a drive circuit 49a, and control signals are fed to the solenoid valves (SA1), (SA2), (SB1), (SB2), (SB3), (SFRH) and so on via the respective drive circuits 49b to 49l. In the microcomputer 41, the ROM 45 memorizes a program corresponding to flowcharts as shown in FIGS. 7 to 9, the CPU 44 executes the program when the ignition switch (not shown) is turned on, and the RAM 46 temporarily memorizes variable data necessary for executing the program. Furthermore, in the microcomputer 41, a band-pass filter is formed so as to serve as the band-pass filter means according to the present invention.

In operation, when the ignition switch (not shown) is turned on, the electric power is fed to the vehicle controller 20, motor controller 30 and anti-skid controller 40. When the brake pedal 13 is depressed, the vehicle controller 20 provides a desired regenerative braking torque in proportion to the depressing force of the brake pedal 13 and outputs it to the motor controller 30, which generates the regenerative braking torque in response to the output from the vehicle controller 20. When the motor controller 30 receives from the vehicle controller 20 the desired regenerative braking torque, the motor controller 30 sets a desired rotational speed, and calculates an absolute value of a difference between the actual rotational speed of the motor 10 and the desired rotational speed, and then controls the motor 10 to rotate at the desired rotational speed. When the brake pedal 13 is released, the vehicle controller 20 and motor controller 30 will rotate the motor 10 to produce a rotating torque in response to a depressed amount of an accelerator pedal (not shown).

A program routine executed by the anti-skid controller 40 will now be described with reference to FIGS. 7–9. FIG. 7 is a flowchart showing a main routine executed in accordance with a program of one embodiment of the present invention. The program routine corresponding to the flowchart as shown in FIG. 7 starts when the ignition switch (not shown) is turned on, and provides for initialization of the system at Step 101 to clear various data such as a wheel speed (Vw), a wheel acceleration (DVw), an estimated vehicle speed (Vso) or the like. Then, at Step 102, signals output from the brake switch 14, pressure sensors (PS1), (PS2) or the like are fed into the RAM 46 through the input port 42 of the anti-skid controller 40. At Step 103, the wheel speed (Vw) is calculated in accordance with the output signal from each of the wheel speed sensors (SP1) to (SP4), and then the wheel acceleration (DVw) is calculated from the wheel speed (Vw) at Step 104. Then, the program proceeds to Step 105, where it is determined whether each of the road wheels is in the anti-skid control operation (abbreviated as ABC control as shown in FIG. 7), or not. If it is determined that the anti-skid control is being made, the program proceeds to Step 106, where the coefficient of friction of the road surface under the anti-skid control is estimated as described later in detail with reference to FIG. 9.

If it is determined at Step 105 that the anti-skid control is not being made, the program proceeds to Step 107, where it is determined whether the conditions for initiating the anti-skid control are fulfilled or not. If it is determined that the conditions have not been fulfilled, the program jumps to Step 114. At Step 108, on the basis of the braking conditions determined by the estimated vehicle speed (Vso) and a slip rate calculated by the wheel speed (Vw) and the estimated vehicle speed (Vso), one of a decrease mode, hold mode and pulse-increase mode is selected. And, at Step 109, it is determined if the selected control mode is the decrease mode. If so, the program proceeds to Step 110 where a decrease mode signal is output. Otherwise, the program proceeds to Step 111 where it is determined if the selected control mode is the pulse-increase mode, and if so, the program proceeds to Step 112, where the pulse-increase mode signal for alternately increasing and decreasing the hydraulic braking pressure is output, thereby to increase the hydraulic braking pressure in the wheel brake cylinder under control, out of the four wheel brake cylinders, gradually. If the control mode is not the pulse-increase mode, the program proceeds to Step 113 where the hold mode signal is output, thereby to hold the hydraulic braking pressure in the wheel brake cylinder (hereinafter, simply referred to as the wheel cylinder pressure). The above-described steps for selecting the control mode and producing the output signals are executed for each wheel brake cylinder. Then, at Step 114, it is determined whether the steps have been executed with respect to all of the four road wheels (FR), (FL), (RR), (RL), and the above-described routine is repeated until the ABS control is executed with respect to all of the road wheels. Thereafter, the program proceeds to Step 115, where the estimated vehicle speed (Vso) is calculated and then returns to Step 102.

The estimation of coefficient of friction under control executed at Step 106 for estimating the coefficient of friction of the road surface (i.e., the road-CF) in the anti-skid control operation will be explained hereinafter with reference to FIG. 8. At the outset, it is determined at Step 201 whether the driven wheel (e.g., front road wheel (FR)) is to be controlled or not. If the non-driven wheel, i.e., one of the rear road wheels (RR), (RL), is to be controlled, the program returns to the main routine in FIG. 7. That is, the routine as shown in FIG. 8 will be executed when the anti-skid control operation is being performed, and the driven wheel is being controlled. If the driven wheel is being controlled, it is determined at Step 202 whether the wheel speed of the driven wheel which passed the band-pass filter is within a certain range (Kf) of frequencies. This range (Kf) is set on the basis of frequencies of oscillation of the wheel speed of the driven wheel which will occur when the anti-skid control operation starts during the vehicle is running on a road of a relatively low coefficient of friction, e.g., frequencies of 10 to 12 Hz, which are varied in dependence upon a type of the vehicle. The range (Kf) may be the same as the band of the band-pass filter. If it is determined that the wheel speed of the driven wheel which passed the band-pass filter is within the certain range of frequencies, the program proceeds to Step 206 where a low-μ flag is set, and then returns to the main routine. Otherwise, the program proceeds to Steps 203–210, where the wheel speed of the driven wheel is compared with predetermined speeds (Vsn), (Vsl), each of which is calculated by multiplying the estimated vehicle speed with a slip rate and adding a certain bias speed to the result. The predetermined speed (Vsl) is set to be smaller than the predetermined speed (Vsn).

At step 203, the wheel speed (Vwf) of the driven wheel, i.e., front road wheel in this embodiment, is compared with the predetermined speed (Vsn). If it is determined that the former is smaller than the latter, the program proceeds to Step 204 where it is further determined whether a time for decreasing the hydraulic pressure in the wheel brake cylinder of the driven wheel exceeds the first predetermined time (T1), e.g., 80 milliseconds. If it is determined at Step 203 that the wheel speed (Vwf) is equal to or greater than the predetermined speed (Vsn), the program proceeds to Step 205. When it is determined at Step 204 that the time for decreasing the hydraulic pressure exceeds a first predetermined time (T1) the program proceeds to Step 206. If it is determined that the time for decreasing the hydraulic pressure is less than the first predetermined time (T1), the program proceeds to Step 205 where the wheel speed (Vwf) is compared with the predetermined speed (Vsl). If it is determined that the wheel speed (Vwf) is smaller than the predetermined speed (Vsl), the program proceeds to Step 206, otherwise the program proceeds to Step 207 where the wheel speed (Vwf) is further compared with the predetermined speed (Vsn). If it is determined that the former is smaller than the latter, the program proceeds to Step 208 where it is further determined whether the time for decreasing the hydraulic pressure exceeds a second predetermined time (T2), e.g., 50 milliseconds, which is set to be smaller than the first predetermined time (T1). If the time for decreasing the hydraulic pressure is equal to or greater than the second predetermined time (T2), the program proceeds to Step 209 where a mid-μ flag is set. If it is determined at Step 207 that the wheel speed (Vwf) is equal to or greater than the predetermined speed (Vsn), the program proceeds to Step 210 where a high-μ flag is set. When it is determined at Step 208 that the time for decreasing the hydraulic pressure is less than the second predetermined time (T2), the program proceeds to Step 210 where the high-μ flag is set.

Accordingly, the coefficient of friction of the road under control is set to one of the low-μ, mid-μ and high-μ. The frequencies for the above-described range are provided in advance for each type of the vehicle, by detecting the frequencies of the oscillation of the wheel speed of the driven wheel which occurs when the anti-skid control operation starts during the vehicle is running on the road of the relatively low coefficient of friction. According to the present embodiment, the front road wheels serve as the driven wheels, so that the estimation of coefficient of friction under control is executed on the basis of the front road wheels. In an electrically controlled vehicle with its rear road wheels serving as the driven wheels, therefore, the estimation of coefficient of friction under control is to be executed on the basis of the rear road wheels.

The estimated vehicle speed (Vso) is calculated according to the flowchart as shown in FIG. 9. At the outset, the maximum value of the wheel speeds (VwFR(n)) etc. of the four road wheels is calculated at Step 301 every control cycle, e.g., 5 milliseconds to provide the maximum wheel speed (Vwo(n)). In FIG. 9, "MAX" designates a function for calculating the maximum value of various date, and "FR" or the like designates the wheel on which the wheel speed was calculated. "(n)" designates the value which was obtained at the n'th cycle, wherein "n" is an integer which is equal to or more than one. Then, the program proceeds to Step 302, where the coefficient of friction of the road on which the vehicle is running is determined. If the coefficient of friction of the road (the road-CF) is determined to correspond to a relatively high value of the coefficient of friction (i.e., the high-μ), the program proceeds to Step 303 where a deceleration (α DW) is set to a predetermined value, e.g., 1.1 G (wherein "G" represents a gravity acceleration). If it is determined that the road-CF does not correspond to the high-μ, the program proceeds to Step 304 where it is determined if the road-CF corresponds to the mid-μ. If the road-CF corresponds to the mid-μ, the program proceeds to Step 305 where the deceleration (α DW) is set to 0.6 G for example, otherwise the program proceeds to Step 306 where the road-CF is determined to correspond to the low-μ, so that the deceleration (α DW) is set to 0.4 G for example. Thereafter, the program proceeds to Step 307 where the acceleration (α UP) is set to 0.5 G for example, and further proceeds to Step 308 where the estimated vehicle speed (Vso(n)) is calculated. That is, the intermediate or middle value is selected to provide the estimated vehicle speed (Vso(n)), out of the maximum wheel speed (Vwo(n)) obtained at Step 301, the estimated vehicle speed (Vso(n−1)) at the previous cycle with the value obtained by multiplying the acceleration (α UP) and the cycle period (T) added to it, i.e., Vso(n−1) +αUP·T, and the estimated vehicle speed (Vso(n−1)) at the previous cycle with the value obtained by multiplying the deceleration (α DW) and the cycle period (T) subtracted from it, i.e., Vso(n−1)−αDW·T. In FIG. 9, "MED" designates a function for obtaining the intermediate value. Then, the program proceeds to Step 309 where the maximum wheel speed (Vwo(n)) is compared with the estimated vehicle speed (Vso(n)). If the maximum wheel speed (Vwo(n)) is smaller than the estimated vehicle speed (Vso(n)), the program proceeds to Step 310 where the time for continuously decreasing the wheel speed is measured by a counter which counts a time for providing the deceleration (α DW) continuously, and which is abbreviated as a α DW counter. If the maximum wheel speed (Vwo(n)) is equal to or greater than the estimated vehicle speed (Vso(n)), the program proceeds to Step 311 where the α DW counter is cleared. Accordingly, it is possible to alter the value for limiting the gradient of the estimated vehicle speed in accordance with the estimated coefficient of friction of the road, and alter the increasing time or decreasing time of the hydraulic pressure in each wheel brake cylinder, which is determined on the basis of each wheel speed and the estimated vehicle speed, in accordance with the estimated coefficient of friction of the road. As a result, the anti-skid operation can be made in accordance with the estimated coefficient of friction of the road, thereby to appropriately perform the anti-skid operation.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels including driven wheels of an electrically operated vehicle, comprising:

wheel brake cylinders operatively connected to said road wheels respectively, for applying braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for controlling the hydraulic braking pressure in each of said wheel brake cylinders;

wheel speed detection means for detecting wheel speeds of said road wheels, and providing output signals corresponding to the wheel speeds, respectively;

band-pass filter means for passing the wheel speeds of said driven wheels having an oscillation property within a predetermined band of frequencies, out of the wheel speeds detected by said wheel speed detection means, coefficient of friction estimation means for estimating a coefficient of friction of a road on which said vehicle is running, wherein said coefficient of friction estimation means estimates that the coefficient of friction of said road is relatively low when the output of said band-pass filter means is in a predetermined range of frequencies; and braking force control means for controlling said actuating means in accordance with at least the coefficient of friction estimated by said coefficient of friction estimation means, and in response to the wheel speeds detected by said wheel speed detection means, thereby to control the braking force applied to each of said road wheels.

2. The anti-skid control system as claimed in claim 1, wherein said predetermined range of frequencies is set in accordance with an oscillation of the wheel speed of said driven wheel which occurs when said vehicle is braked during said vehicle is running on a road having a relatively low coefficient of friction.

3. The anti-skid control system as claimed in claim 1, further comprising vehicle speed estimation means for estimating a vehicle speed on the basis of the wheel speeds of said road wheels detected by said wheel speed detection means, and the coefficient of friction of said road estimated by said coefficient of friction estimation means.

4. The anti-skid control system as claimed in claim 3, wherein said vehicle speed estimation means estimates the vehicle speed to be relatively high, when said coefficient of friction estimation means estimates the coefficient of friction of said road to be relatively low.

5. The anti-skid control system as claimed in claim 1, wherein said braking force control means controls said actuating means to provide a period for decreasing or increasing the hydraulic braking pressure in each of said wheel brake cylinders operatively mounted on said driven wheels, on the basis of the coefficient of friction of said road estimated by said coefficient of friction estimation means.

6. The anti-skid control system as claimed in claim 5, wherein the period for decreasing the hydraulic braking pressure is provided to be relatively long when the estimated coefficient of friction of said road is relatively low.

7. The anti-skid control system as claimed in claim 5, wherein the period for increasing the hydraulic braking pressure is provided to be relatively short when the estimated coefficient of friction of said road is relatively low.

* * * * *